United States Patent Office 3,481,938
Patented Dec. 2, 1969

3,481,938
PROCESS FOR THE PREPARATION OF PIPERIDINE
Guy Chichery, Pierre-Benite, and Philippe Perras, Lyon, France, assignors to Rhone-Poulenc S.A., Paris, France, a French body corporate
No Drawing. Filed Feb. 23, 1967, Ser. No. 617,842
Claims priority, application France, Feb. 25, 1966, 51,196
Int. Cl. C07d 29/06, 29/04
U.S. Cl. 260—293.2
10 Claims

ABSTRACT OF THE DISCLOSURE

Piperidine is obtained directly by reacting glutaric acid or its anhydride with ammonia and hydrogen under pressure at a temperature between 150° and 350° C. in the presence of a hydrogenation catalyst.

---

This invention relates to a new process for the preparation of piperidine.

Hitherto, the process most generally employed for the preparation of piperidine has consisted in the catalytic hydrogenation of pyridine under pressure. However, this process has the disadvantage that it involves the use of pyridine, which is a manufactured product in ever increasing demand in industry for other applications wherein its use is essential.

It has also been proposed to employ other starting materials for piperidine such as pentamethylenediamine, glutaraldehyde, tetrahydropyran or certain furfuryl derivatives, but these are difficult to obtain and, moreover, are expensive to use.

Catalytic reduction under pressure, in the presence of ammonia, of starting materials such as methyl glutarate, glutaramide or glutaronitrile, also produces piperidine.

On the other hand, no attempt has yet been made to prepare piperidine directly from glutaric acid. This is the more surprising as glutaric acid is industrially a very advantageous starting material, because it constitutes a considerable by-product arising from the production of adipic acid and its commercial utilisation is an economic problem which has not yet been solved.

There has now been found, and this constitutes the subject of the present invention, a process by means of which glutaric acid or its anhydride may be directly converted into piperidine.

According to the invention, piperidine is prepared by reacting glutaric acid or its anhydride with ammonia and hydrogen under a pressure of from 50 to 500 bars (preferably between 200 and 300 bars) and at a temperature between 150° and 350° C. in the presence of a hydrogenation catalyst.

The reaction may take place in the absence or presence of a solvent which is inert under the operating conditions employed.

Advantageously, water or a cyclic ether, for example dioxan or tetrahydrofuran, is used as the solvent.

In order to ensure a sufficient reaction speed it is preferred to operate at a temperature above 180–200° C. Moreover, in order to limit possible decomposition of the piperidine formed, it is generally preferable not to exceed a temperature of 280–300° C.

The quantities of ammonia employed are not critical as a very large excess is not harmful to the reaction. Theoretically, the reaction requires at least one molecule of ammonia per molecule of glutaric acid; in practice, a proportion of 1.5 to 5 molecules of ammonia per molecule of glutaric acid is generally quite suitable.

The nature of the hydrogenation catalysts is not critical.

For example, hydrogenation catalysts based upon metals such as ruthenium, rhodium, palladium, platinum, cobalt, nickel, chromium or copper may be employed. However, it is to be noted that ruthenium-based catalysts, e.g. ruthenium on carbon black, are preferred because their higher activity makes it possible to obtain the best yields in conjunction with the lowest reaction temperatures.

The reaction time will vary according to the pressure, temperature and catalyst employed; generally, using a pressure of 200–300 bars and a temperature between 200 and 300° C., the reaction is completed within 4 to 8 hours.

The process may be carried out continuously or discontinuously. In practice, the following procedure may be adopted.

Glutaric acid or its anhydride, the solvent, if one is employed, and the catalyst are introduced into an autoclave, which is purged with nitrogen, and ammonia is introduced. Hydrogen is thereafter admitted under a pressure such that the pressure in the autoclave is between 200 and 300 bars at the reaction temperatures. The mixture is stirred and then brought to the desired reaction temperature, the effect of which is to initiate the absorption of hydrogen; pressure is stabilised by further admissions of hydrogen. When the theoretical amount of hydrogen has been absorbed and the reaction is complete, the autoclave is cooled and the reaction mixture is released to atmospheric pressure and filtered to separate the catalyst.

The piperidine is thereafter isolated by any suitable known method. For example, the following procedure may be adopted: After washing of the catalyst with ethanol, the solution obtained is distilled under atmospheric pressure to separate the solvents and the piperidine from the non-volatile residue. The volatile fraction, to which concentrated hydrochloric acid is added and which is evaporated to dryness, yields piperidine hydrochloride, which is treated with a concentrated aqueous sodium hydroxide solution to regenerate the piperidine. The latter is then extracted with diethyl ether and the solution distilled to yield piperidine.

The following examples illustrate the invention.

EXAMPLE 1

Into a 500 cc. autoclave there are introduced 132 g. of glutaric acid (1 mol.), 100 cc. of dioxan and 13 g. of a catalyst containing 5% of ruthenium deposited on carbon black.

The autoclave is closed and, after purging with nitrogen and then with hydrogen, 31 g. of ammonia are injected into the reaction mixture. Hydrogen is then admitted under a pressure of 150 bars, stirring is started and the autoclave is heated, the heating being adjusted so as to produce a temperature of 210° C. in the autoclave. Further hydrogen charges are carried out in the course of the operation in order to maintain the pressure between 200 and 300 bars under the temperature conditions adopted. At the end of 4 hours 20 minutes, the theoretical quantity of hydrogen has been absorbed, and the autoclave is then cooled to ambient temperature and the reaction mixture is taken down to atmospheric pressure and filtered to separate the catalyst, which is washed on a filter with 150 cc. of ethanol.

The liquid obtained is then fractionated under atmospheric pressure and the fraction distilling between 76° and 107° C., which contains the solvents and the piperidine, is recovered. To this fraction are added 100 cc. of 10 N hydrochloric acid, and the mixture is then evaporated to dryness. The piperidine hydrochloride thus obtained is treated with 120 cc. of 10 N sodium hydroxide and the regenerated piperidine is extracted in four operations with a total of 600 cc. of diethyl ether.

The ethereal solution is dried over sodium sulphate and fractionated under atmospheric pressure. After elimination of the ether, there is recovered the fraction distilling between 102° and 106° C., which weighs 48 g. and contains 92% of piperidine.

The yield of pure piperidine is 52.1%.

EXAMPLE 2

The procedure of Example 1 is repeated, the ruthenium catalyst being replaced by 32 g. of catalyst containing 60% of cobalt deposited on kieselguhr, and the operation being carried out at 270° C. instead of 210° C. The reaction lasts 6 hours 45 minutes.

After treatment of the reaction product as described in Example 1, there are recovered 38.2 g. of product titrating 87% of piperidine. The pure piperidine yield of the operation is thus 39.2%.

We claim:

1. Process for the preparation of piperidine which comprises reacting glutaric acid or its anhydride with ammonia and hydrogen under a pressure of from 50 to 500 bars and at a temperature between 150° and 350° C. in the presence of a hydrogenation catalyst.

2. Process according to claim 1 in which the reaction is effected under a pressure between 200 and 300 bars and at a temperature between 180° and 300° C.

3. Process according to claim 1 in which the reaction is carried out in the presence of a solvent which is inert under the reaction conditions employed.

4. Process according to claim 3 in which the solvent is selected from water and cyclic ethers.

5. Process according to claim 1 in which 1.5 to 5 molecules of ammonia per molecule of glutaric acid are employed.

6. Process according to claim 1 in which the hydrogenation catalyst is ruthenium, rhodium, palladium, cobalt, nickel, chromium or copper catalyst.

7. Process according to claim 1 in which a ruthenium hydrogenation catalyst is employed.

8. Process according to claim 6 in which the catalyst is selected from ruthenium on carbon black and cobalt on kieselguhr.

9. Process according to claim 1 for the preparation of piperidine which comprises reacting glutaric acid or its anhydride with ammonia and hydrogen under a pressure of from 200 to 300 bars and at a temperature between 180° and 300° C. in the presence of a hydrogenation catalyst and a cyclic ether solvent.

10. Process according to claim 9 in which the hydrogenation catalyst is selected from ruthenium on carbon black and cobalt on kieselguhr.

References Cited

Paden et al., J. Am. Chem. Soc., vol. 58, pp. 2487–99 (1936).

HENRY R. JILES, Primary Examiner

G. THOMAS TODD, Assistant Examiner